(No Model.)
J. PHELPS.
CAR COUPLING.
No. 327,014. Patented Sept. 29, 1885.
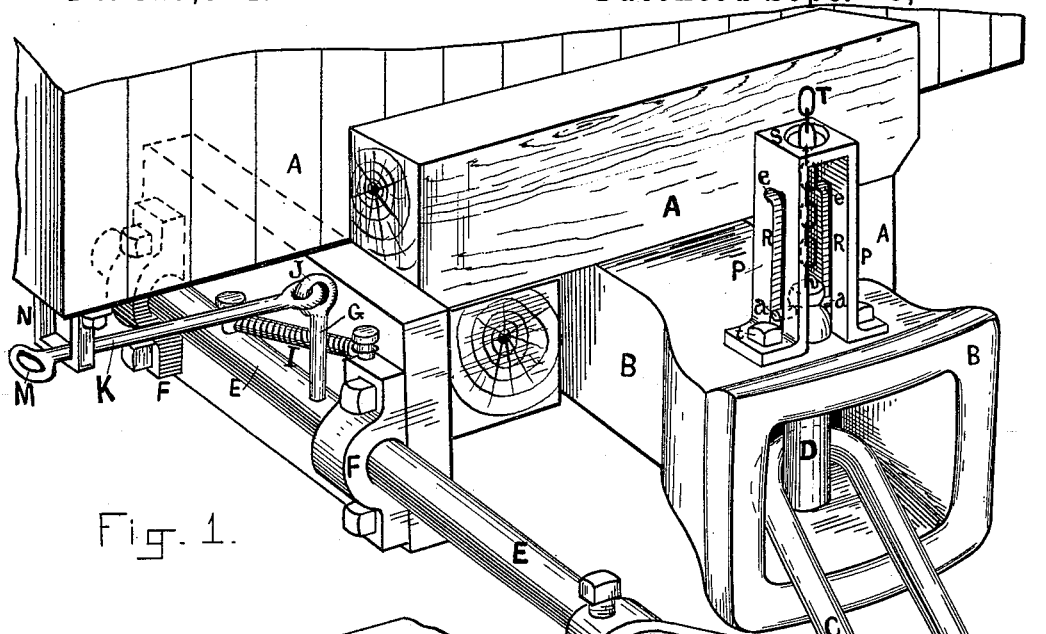
Fig. 1.
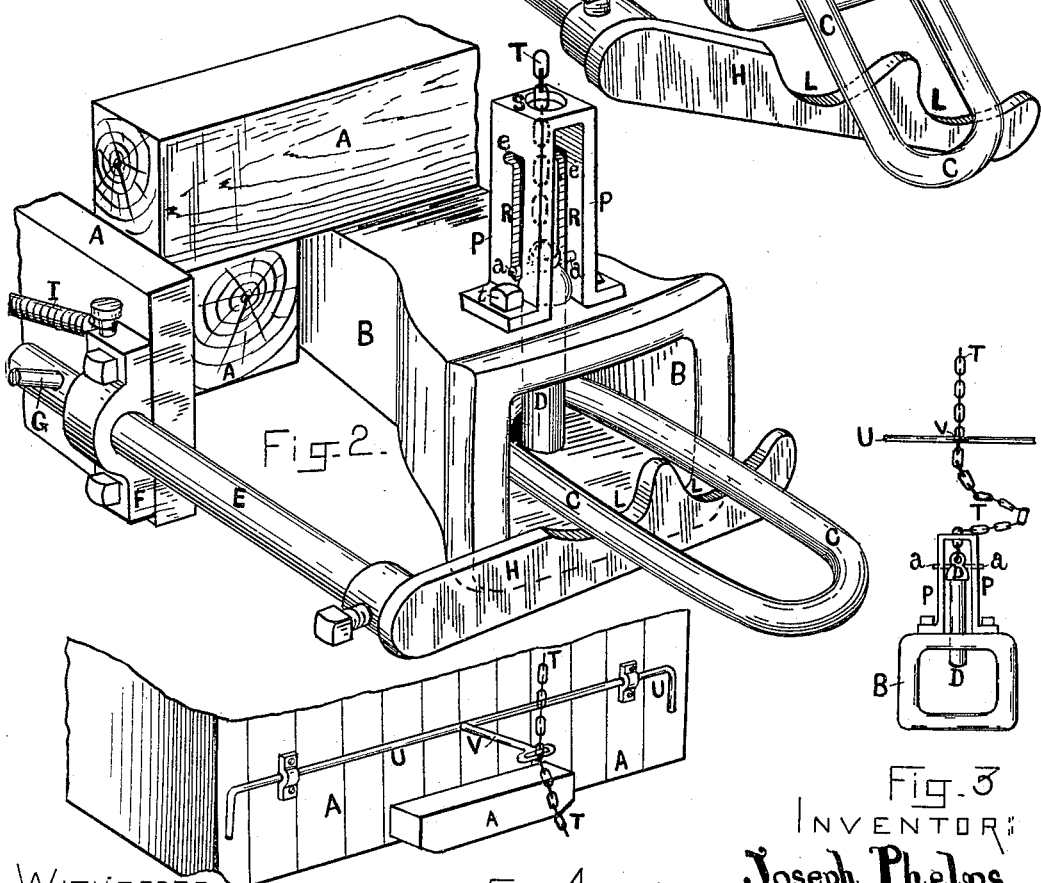
Fig. 2.
Fig. 4.
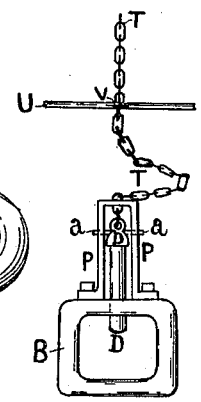
Fig. 3.
WITNESSES:
Chas. S. Gooding.
W. R. Marble.
INVENTOR:
Joseph Phelps
by Sylvenus J Walker
Atty.

UNITED STATES PATENT OFFICE.

JOSEPH PHELPS, OF NEWTON, MASSACHUSETTS.

CAR-COUPLING.

SPECIFICATION forming part of Letters Patent No. 327,014, dated September 29, 1885.

Application filed February 27, 1885. (No model.)

*To all whom it may concern:*

Be it known that I, JOSEPH PHELPS, of Newton, in the county of Middlesex and State of Massachusetts, have invented an Improvement in Car-Coupling Devices, of which the following is a specification.

The object of my invention is to provide a coupling device whereby cars having a link and pin for coupling two draw-bars together the pin may be raised and held in position and the coupling-link raised and guided into the mouth of the opposite draw-bar and the coupling-pin inserted through the link, so as to couple the two draw-bars together without the necessity of passing between the ends of the cars to operate the coupling link and pin by hand, as heretofore employed for the purpose; and it consists in the construction, combination, and arrangement of the coupling device hereinafter more fully described, and specifically set forth in the claims.

Figure 1 represents a perspective view of a car-coupling having my coupling device attached thereto. Fig. 2 represents a similar view of the same with the coupling-link raised into position to enter the mouth of the opposite draw-bar. Fig. 3 represents a similar view, showing the coupling-pin raised into position, ready to be dropped into position through the coupling-link when the opposing draw-bars are brought together in the act of coupling. Fig. 4 is a similar view of the pin-actuating mechanism.

A represents a portion of a freight-car provided with a draw-bar, B, coupling-link C, and pin D, of the usual construction, and as now in general use for coupling cars together.

Now, in order that the said coupling-link C may be raised upward and guided into the mouth of the opposite draw-bar, B, so as to be coupled thereto by the insertion of the said pin D, through the said coupling-link C when received within the mouth of the draw-bar by the said pin being thus jarred down, or so as to fall by means of the concussion when the opposing draw-bars B are brought together with force by the movement of one of the cars, as hereinafter described, I apply to the sill of the car-body A a sliding rocker-bar, E, having bearings near each end in the bearings F, and to the forward end of the said rocker-bar E is provided a right-angle arm, H, the upward face of which is formed with two incline-faced notches, L, adapted to engage with the said coupling-link C when brought into contact with the under side of the same in the act of raising the said link C by the partial rotation of the said rocker-bar E by means of the short vertical arm or stud G, secured to the said shaft, and provided at its upward end with an eye, J, into which is connected loosely one end of the horizontal operating-rod K, the opposite end of which is provided with a handle, M, and is supported in position by a bracket, N, through the end of which the said operating-rod K passes loosely, the opposite end of the supporting-bracket N being secured to the car-body A, as shown.

It will be seen in Fig. 1 that the said bar E is provided with a spring, I, whereby the said rocker-bar E is adapted to be forced or slid horizontally within its bearings, the spring I yielding against the pressure brought to bear upon the said arm H, so as to slide the rocker-bar E horizontally rearward. When released, said spring I will return the said rocker-bar and its link-actuating arm to their former position, the said actuating-arm H resting at an incline, with its inward end below the end of the said draw-bar B, and when swung or raised upward contacts with the lower side of the said coupling-link C at a point close to or near the mouth end of the draw-bar B. The inward end of the coupling-link being held in the mouth of the draw-bar by the coupling pin D, the outward end of the coupling link C may be elevated into position to enter the opposite draw-bar mouth by drawing the said horizontal operating-rod K outwardly more or less, as the height of the opposite draw-bar mouth may require, to permit the end of the link to enter.

To the top side or upward face of the said draw-bar B, I attach the pin-holding device at opposite sides of the pin-hole formed through the draw-bar, as usual. This pin-holding device is constructed of a flat bar of iron bent into the form shown, or cast from metal, if preferred, and consists of two vertical parallel side portions, P, provided with vertical slots R, extending from a point near the lower end thereof upward to a point near the connected upward end portion, where they are provided with a small notch, *e*. The connecting upward end portion of the said vertical side supports, P, is provided with an opening, S, through which an operating-chain, T, passes, its lower end being connected to the upward end of the said coupling-pin D, which is provided with a small guide pin or pins, $d$, which project at right angles therefrom and enter said slots R, and traverse the same as the said coupling-pin D is raised upward by the said chain until the top of the said slots are reached, when the said guide-pins $d$ enter the said notches $e$, and thereby retain the said coupling-pin D suspended until the concussion of an opposite draw-bar with the said draw-bar thus provided jars the pins from the said notch $e$ and permits the coupling-pin D to descend or fall and drop through the coupling-link C provided in the draw-bar which is intended to be coupled therewith when the two cars thus provided with the above-described devices are brought together in the usual manner to be shackled or coupled together.

To enable the said coupling-pin D to be operated or raised upward into position from either side of the car, I provide a rocking cross-rod, U, journaled or supported in a horizontal position upon the end of the car-body A, as shown, and provided mid-length with a short arm, V, to the outward end of which is secured the said operating-chain S, which extends upward to the top of the car, or into such position as to permit the same to be operated by a brakeman upon the top of the car, so as to draw the said coupling-pin D to unshackle two cars whenever desired, or to elevate the said pin into position to be actuated when coupling cars as above described.

It will be seen and understood that the said operating-chain S is retained in its actuating position at a slight angle from the vertical plane of the guide-slots R of the said coupling-pin-holding device, so as to draw the holding or suspension pins $d$ against the rear faces of the said slots R, and thereby cause the same to enter the notches $e$ provided therein, as shown.

The lower ends of the side portions, P, of said pin holding and controlling device are bent at right angles and provided with screw-holes $t$, whereby the same may be secured in position on the top of the draw-bar B by means of bolts or screws inserted therein, or in any other desired manner. It will be seen that the incline-faced notches L of the said link-actuating arm H, when brought into contact with the link, will cause the same to assume a "centering" position in line with the draw-bar to which it is coupled by the pin.

Having thus described my invention, what I claim is—

The combination, with the draw-bar B, having a coupling-link, C, and pin D, of the rocker-bar E, having an arm, H, provided with incline-faced notches L, adapted to engage with said coupling-link when actuated by means of the stud G, and operating-rod K, so as to raise said link, as set forth.

JOSEPH PHELPS.

Witnesses:
SYLVENUS WALKER,
CHAS. S. GOODING.